United States Patent
Fodor et al.

(10) Patent No.: US 7,706,325 B2
(45) Date of Patent: Apr. 27, 2010

(54) METHOD AND SYSTEM FOR HANDLING CONTEXT OF DATA PACKET FLOWS

(75) Inventors: Gabor Fodor, Hässelby (SE); Anders Eriksson, Kista (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 475 days.

(21) Appl. No.: 10/584,862

(22) PCT Filed: Dec. 30, 2003

(86) PCT No.: PCT/SE03/02100

§ 371 (c)(1),
(2), (4) Date: Jun. 28, 2006

(87) PCT Pub. No.: WO2005/064892

PCT Pub. Date: Jul. 14, 2005

(65) Prior Publication Data
US 2007/0121508 A1    May 31, 2007

(51) Int. Cl.
H04W 4/00    (2009.01)

(52) U.S. Cl. .................. 370/331; 455/436; 455/442

(58) Field of Classification Search ............ None
See application file for complete search history.

(56) References Cited

U.S. PATENT DOCUMENTS

| | | | |
|---|---|---|---|
| 6,526,444 B1 * | 2/2003 | Blair | 709/225 |
| 6,724,747 B1 * | 4/2004 | Arango et al. | 370/352 |
| 7,284,057 B2 * | 10/2007 | Kulkarni et al. | 709/227 |
| 7,388,851 B2 * | 6/2008 | Trossen | 370/331 |
| 7,420,943 B2 * | 9/2008 | Lakshmi Narayanan et al. | 370/331 |
| 7,440,429 B2 * | 10/2008 | Fodor et al. | 370/331 |
| 2003/0103496 A1 | 6/2003 | Lakshmi Narayanan et al. | |
| 2003/0214922 A1 | 11/2003 | Shahrier | |

(Continued)

FOREIGN PATENT DOCUMENTS

WO    03/052962    6/2003

OTHER PUBLICATIONS

P. Srisuresh, "Middlebox Communications (MIDCOM) Architecture and framework", IETF RFC3303; http://www.ietf.org/rfc/rfc3303.txt.*

(Continued)

*Primary Examiner*—Pankaj Kumar
*Assistant Examiner*—Ajay P Cattungal
(74) *Attorney, Agent, or Firm*—Nixon & Vanderhye, P.C.

(57) ABSTRACT

The present invention relates to the handling of context of data packet flows. As mentioned, there is a need of a coordination mechanism for the transfer of context for flows that belong to the same session. One object with the invention is to offer a coordination mechanism for the handling of context associated to flows that belong to the same session. The above-mentioned object is achieved by a context procedure, in which the total context for a session is divided into one common context and one dynamic context per IP flow. The common context is handled by a centralized control node, such as a Midcom Agent, and the dynamic context is handled by a middlebox associated to an access router. The context transfer procedures for the two types of contexts are coordinated so that an unambiguous session control is maintained.

15 Claims, 3 Drawing Sheets

U.S. PATENT DOCUMENTS

| | | | |
|---|---|---|---|
| 2004/0005894 A1* | 1/2004 | Trossen et al. | 455/436 |
| 2004/0109458 A1* | 6/2004 | Lakshmi Narayanan et al. | 370/401 |
| 2005/0220054 A1* | 10/2005 | Meier et al. | 370/331 |
| 2008/0151837 A1* | 6/2008 | Soininen et al. | 370/331 |

OTHER PUBLICATIONS

J. Kempf (ed), "Problem Description: Reasons for Performing Context Transfers Between Nodes in an IP Access Network" (RFC 3374); http://www.ietf.org/rfc/ rfc3374.txt.

R.P. Swale et al.,"Middlebox Communications (MIDCOM) Protocol Requirements", IETF RFC 3304; http://www.ietf.org/rfc/ rfc3304.txt.

B. Carpenter et al, "Middleboxes: Taxonomy and Issues", IETF RFC 3234, 2002; http://www.ietf.org/rfc/ rfc3234.txt.

R. Hancock (ed): Next Steps in Signalling: Framework, IETF Internet draft, Oct. 2003; http://www.ietf.org/html.charters/nsis-charter.html.

Kempf, ed., *Problem Description: Reasons for Performing Context Transfers Between Nodes in an IP Access Network*, Network Working Group, Request for Comments: 3374, Sep. 2002, 13 pages.

* cited by examiner

METHOD AND SYSTEM FOR HANDLING CONTEXT OF DATA PACKET FLOWS

This application is the U.S. national phase of international application PCT/SE2003/002100 filed 30 Dec. 2003, which designated the U.S., the entire content of which is hereby incorporated by reference.

FIELD OF INVENTION

The present invention relates to a method for handling context of data packet flows, a network system, a Midcom Agent and a computer program product for performing the steps of said method.

BACKGROUND OF THE INVENTION

The technical field relates to transfer of data packet flow related state and context information in access networks.

Following documentation is regarded as state of the art:
[1] J. Kempf (ed), "Problem Description: Reasons for Performing Context Transfers Between Nodes in an IP Access Network" (RFC 3374);
[2] J. Loughney (ed),"Context transfer protocol", IETF, Internet draft, October 2003;
[3] G. Kenward (ed), "General Requirements for context transfer", IETF Internet draft, October 2002;
[4] R. P. Swale et al., "Middlebox Communications (MIDCOM) Protocol Requirements", IETF RFC 3304;
[5] B. Carpenter et al, "Middleboxes: Taxonomy and Issues", IETF RFC 3234, 2002;
[6] P. Srisuresh, "Middlebox Communications (MIDCOM) Architecture and framework", IETF RFC3303;
[7] R. Hancock (ed): Next Steps in Signaling: Framework", IETF Internet draft, October 2003;

For context transfer purposes, the organization IETF has developed the Context Transfer protocol (see references [1], [2], [3]). In these documents, the context is defined as the information on the current state of a service required to re-establish the service on a new subnet without having to perform the entire protocol exchange with the mobile host from scratch and Context transfer is defined as the movement of context from router or other network entity to another as a means of re-establishing specific services on a new subnet or collection of subnets.

In IP (Internet Protocol) access networks that support host mobility, the routing paths between the host and the network may change frequently and rapidly. For example, Mobile IP networks allow a mobile node or an entire moving network to change the access router that provides the first IP layer hop seen from the mobile node or from a moving network's edge. When the mobile node changes access router (due to, for instance, mobility), there is a need to establish a new path, whose nodes should ideally provide similar treatment to the IP packets as was provided along the old routing path.

In some cases, the host may establish certain context transfer candidate services on subnets that are left behind when the host moves. Examples of such services are Authentication, Authorization and Accounting (AAA), header compression and Quality of Service (QoS). In order for the host to obtain those services on the new subnet, the host must explicitly re-establish the service by performing the necessary signalling flows from scratch. This process may in some cases considerably slow the process of establishing the mobile host on the new subnet.

During the fast handoff, state information has to be transferred between access routers. Examples of state information that could be useful to transfer are Authentication, Authorization and Accounting (AAA) information, security context, QoS properties assigned to the IP flow, header compression information, etc.

A possibility is to simply move all the context from one access router AR to the other access router of a selected access point after handover. Said mechanism works properly when handling single IP flows. However, drawbacks have been recognized concerning services and sessions wherein more than one flow is involved. For example, Multimedia sessions may involve several parallel IP flows, one for voice, one for video, and one for whiteboard. After a hand-over between two access points, it is not unusual that IP flows belonging to the same session are distributed on different radio interfaces of a terminal. In such a situation, the flows of a session are distributed on two access routers after the hand-over and associated context transfer. The context transfer must then be performed in both access routers, since there is no master access router that can assume responsibility for the session context. This would lead to a context synchronization problem since the session context may have to be renegotiated during a session. For example, the bandwidth of the session may be renegotiated.

The transfer of IP flow related state and context information is facilitated by the IETF Context Transfer protocol (see reference [2]).

The IETF MIDCOM working group (WG) has examined scenarios and defined protocols for IP networks that contain entities that perform functions apart from traditional layer 3 (L3) routing, so called middleboxes (MB) (see references [4], [5], [6]). A middlebox is defined as any intermediary device performing functions other than the normal, standard functions of an IP router on the datagram path between a source host and a destination host. Such middleboxes may require a context that is specific to the functions and services they perform. For instance, a Quality of Service scheduler may need to maintain some token bucket state associated with an IP flow (QoS context), a firewall may need to know about a security association of an IP flow (security context), etc. For the moment, it is possible to list 22 different kind of middleboxes that could be provided along an end-to-end path.

Middleboxes embed application intelligence within the device to support specific application traversal. Middleboxes supporting the Middlebox Communication (MIDCOM) protocol will be able to externalize application intelligence into Midcom agents. Therefore, Midcom agents are logical entities which may reside physically on nodes external to a middlebox, possessing a combination of application awareness and knowledge of middlebox function. A Midcom agent may communicate and interact with one or more middleboxes. Said Midcom protocol between a Midcom agent and a middlebox allows the Midcom agent to invoke services of the middlebox and allow the middlebox to delegate application specific processing to the Midcom agent. Further, the Midcom protocol enables the, middlebox to perform its operation with the aid of Midcom agents, without resorting to embedding application intelligence.

The particular end-to-end path, along which some middleboxes may need context can traverse multiple operator domains. Herein, a domain or administrative (operator) domain is the collection of hosts, routers, middleboxes and the interconnecting networks managed by a single administrative authority or owner. The devices that operate in the same administrative domain share common security features that are administered across the domain. It is an issue how to distribute the context to the middleboxes that need the context, since the operator domain where the hand-over occurred may be unaware of the particular middleboxes that are located in another provider's or operator's domain.

As mentioned, there is a need of a coordination mechanism for the transfer of context for flows that belong to the same session.

One object with the technology disclosed herein is to offer a coordination mechanism for the handling of context associated to flows that belong to the same session.

In simple terms, a problem addressed by the technology disclosed herein is to define a context transfer procedure that meets the above requirements, and an object of the technology disclosed herein is to provide a solution to the stated problem.

SUMMARY

A problem is solved according to the technology disclosed herein by a procedure coordinating the transfer of context that is specific for each flow with the transfer of context that is common for all flows.

The above-mentioned object is achieved by a method for handling context of data packet flows, a network system, a Midcom Agent and a computer program product for performing the steps of said method, in which the total context for a session is divided into one common context and one dynamic context per IP flow. The common context is handled by a centralized control node, such as a Midcom Agent, and the dynamic context is handled by a middlebox associated to an access router. The context transfer procedures for the two types of contexts are coordinated so that an unambiguous session control is maintained.

An advantage with of the technology disclosed herein is that it enables session-oriented IP-flow control in multi-access networks.

A further advantage is that the flows of a session may be distributed on different radio access points utilizing the knowledge that they belong to the same session, and originate from the same terminal. For example, the flows of a specific session may be distributed on different radio access points with the boundary condition that the access points belong to the same operator. The fulfilment of this boundary condition facilitates session management and charging.

Yet another advantage is that the transfer of context is better organized and controlled with the Midcom Agent and middlebox architecture than in known architectures.

Further one advantage is that the division of the total context into common context and dynamic context results in faster context transfer between access routers. The common context is stored in the central entities, i.e. the Midcom Agents, and the dynamic context is stored in the middleboxes and transferred between the access router nodes. Only the dynamic context will be moved, when a data packet flow changes to another access router within a domain. Less amount of transferred context results in faster networks.

BRIEF DESCRIPTION OF THE DRAWINGS

FIG. 2b is a flow chart showing a second part of the method according to the example embodiment. The flow chart starts in FIG. 2a.

DETAILED DESCRIPTION

Figure 1:
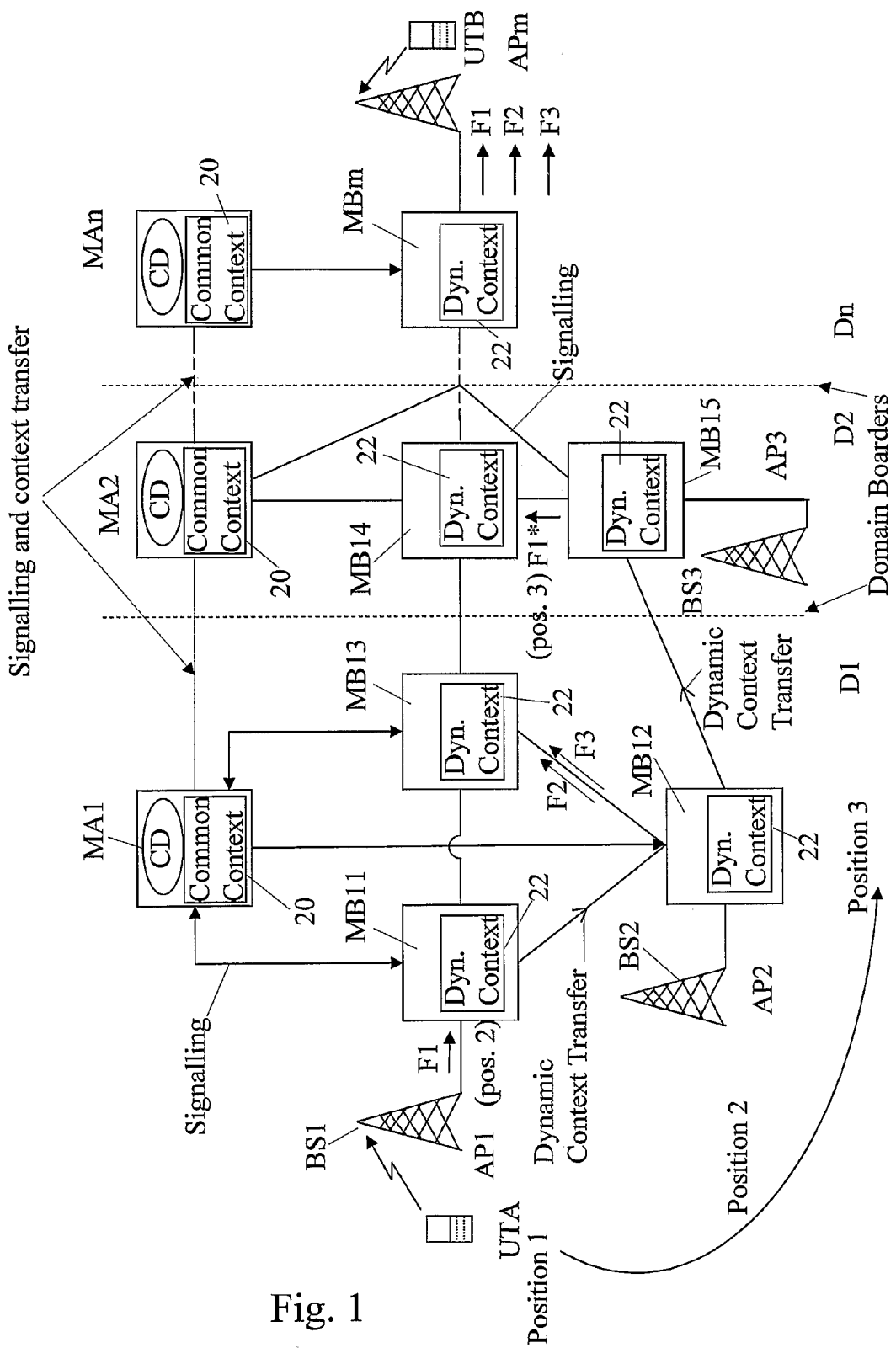
FIG. 1 is a schematic block diagram illustrating a network system according to a preferred embodiment of the invention.

FIG. 1 is a schematic block diagram illustrating a network system according to a preferred example embodiment. In the figure is illustrated Internet protocol (IP) flow paths over a number of domains D1-Dn between two end user terminals UTA, UTB. Said IP information flow is passing a number of middleboxes MB. Each domain comprises one Midcom Agent MA controlling at least one associated middlebox MB. The middleboxes are associated to router nodes that is routing the flow of data packets in accordance with their IP address. The IP flow is generated by one of the user terminals during an end-to-end session. The middleboxes MB store context data for each IP session flow. Once the middleboxes MB within a domain D receive context data, they establish and store the associated context. As user data packets arrive at the middleboxes MB of a domain D, the respective middlebox MB associate these packets with their proper context and provide them with appropriate context dependent service. Such context dependent service is specific to the respective middlebox MB. A middlebox MB has means for controlling its operation and function. It also comprises means for handling context, e.g. reading, sorting, selecting, deleting, writing, storing, etc. A middlebox has also means for communicating with its associated Midcom Agent by means of one or more suitable protocols. Further, a middlebox comprises means for communicating with other middleboxes by means of one or more suitable protocol. According to the technology disclosed herein, the Middleboxes are provided with means for storing 22, i.e. a data storage, dynamic context. The middleboxes can be implemented by means of computer software program comprising coded instructions, when said computer program software is stored in a computer usable medium and run in a computer or processing means, such as e.g. a server unit, a microprocessor, PC, data processing unit, CPU, etc.

As mentioned above, the network comprises a IP layer state-full protocol, for example NSIS, that is implemented by the user terminal as well as all involved middleboxes MB. (Said protocol is described further down in this description.) A vertical protocol, for example the Midcom protocol, allows Midcom Agents to distribute and/or redistribute context information among middleboxes that are under control of said Midcom Agent. Said protocols contains information elements that allows the description of contexts.

When a user terminal UT starts a session, it starts signalling along the end-to-end path UTA-UTB in order for the context, e.g. session related context, to get established in the middleboxes MB along the path UTA-UTB. That is, in all middleboxes MB that the user session data is going to traverse, the proper QoS, security or other context needs to be established and configured. The user terminals UT use a session layer, e.g. SIP/SDP (Session Initiation Protocol/Session Description Protocol), and/or an IP level signalling protocol, that supports the establishment and manipulation of arbitrary state information along the path of the IP flow. Such IP level stateful multi-domain protocol that is being standardized by the IETF is the group of protocols termed Next Steps in Signalling (NSIS) (see reference [7]). The NSIS protocol family is therefore the preferred IP level signalling protocol of the technology disclosed herein.

NSIS carries all information elements that are necessary to establish proper context in each domain D. The respective Midcom Agents MA that receive this signalling, examine the information elements and use the Midcom protocol to distribute context information to the middleboxes MB that are under their control. Hence, the interface between separate Midcom Agents MA is a state-full, horizontal, and domain independdent protocol. The NSIS protocol fulfil these requirements. The Interface between the Midcom Agent MA and its associated middleboxes MB is the Midcom protocol.

A Midcom Agent MA has means for controlling its operation and function. It also comprises means for handling context, e.g. reading, sorting, selecting, deleting, writing, storing, etc. Midcom Agent MA has also means for communicating with its associated middleboxes MBs by means of one or more suitable protocols. Further, a Midcom Agent MA comprises means for communicating with other Midcom Agents MAs by means of one or more suitable protocol over a control plane. According to the td technology disclosed herein, the Midcom Agents are provided with Context Dividers CD for dividing the total context for a session consisting of multiple IP flows and means for storing 20, i.e. a data storage, common context. The Midcom Agent MA can be implemented by means of computer software program comprising coded instructions, when said computer program software is stored in a computer usable medium and run in a computer or processing means, such as e.g. a server unit, a microprocessor, PC, data processing unit, CPU, etc.

Domain D1 comprises two access points AP 1, AP 2 for mobile communication with mobile user terminals. Each access point AP1, AP2 comprises an access router AR (not shown), which is connected over an interface to a base station BS in a mobile radio access network. User movement may cause a handover to a new base station and a new access router.

The change of access router AR results in a new IP flow path, and middleboxes MB along the new path have to be up-graded regarding the proper, i.e. the valid, context data. In FIG. 1, user terminal UTA is communicating with user terminal UTB via a flow path starting in UTA that is communicating via a radio interface with the base station BS in access point AP1 comprising an access router AR (not shown) and middlebox MB11. The flow of data packets will flow through the network, starting in middlebox MB11, passing a number of domains and middleboxes, which have the proper context for controlling and supporting the IP flow of data packets, and finally arrive at middlebox MBm, which is associated to an access router AR in the access point APm. Access point APm is capable of communicating with the user terminal UTB. The flow path in the network can be described as starting in middlebox MB11, passing through MB13 to MBm.

A situation is illustrated in FIG. 1 wherein the User Terminal UTA is moving towards the access point AP2. If the terminal UPA is measuring the received signal strength from the surrounding base stations BS, the User Terminal UTA may find it necessary to perform a handover to the base station BS2 in AP2, as the signal strength from BS1 (associated with AP1) becomes weaker than from BS2. The movement is therefore causing a layer 2 (L2) trigger in the terminal resulting in a handover to BS2 and AP2. Three positions 1, 2 and 3 for the moving user terminal UTA is given in FIG. 1. The terminals UTA and UTB are involved in a multimedia session wherein three separate IP flows F1,F2,F3 (for example one for voice, one for video, and one for whiteboard ) are progressing simultaneously. For different reasons, said separate IP flows may be connected to different access points of the network structure. In the first position, all these IP flows F1,F2,F3 may be connected to access point AP1. When the terminal has moved to the second position, only one of the separate IP flows, F1, is connected to AP1, and the other two IP flows F2,F3 are connected to access point AP2. In position 3, when the terminal is somewhere between AP2 and access point AP, the two IP flows F2,F3 that where connected to AP2 in position 2 are still connected to AP2, but the IP flow F1 is transferred to access point AP3, which belongs to another domain, D2.

The change of access router results in a new IP flow path, and middleboxes along the new path has to be up-graded regarding the proper, i.e. the valid, context data.

According to the technology disclosed herein, the Midcom Agents comprise a context divider function. At session initiation, one of the User terminals starts signalling along the end-to-end path in order for the context to get established. The context divider divides the total context according to a predetermined schedule into one common context and one dynamic context per IP flow. The common context is stored within the Midcom Agent, but the specific dynamic context data is distributed to that middlebox to which the special IP flow, to which the specific dynamic flow belongs, passes. The means for dividing the total context, context divider CD, for a session consisting of multiple IP flows in the Midcom Agents MA divides the context into two types of contexts. The first type is called the common context and includes information elements that are common for all flows in the session. Moreover, the common context includes such information about each flow in the session that is permanent over the lifetime of the session, or can be renegotiated using e.g. session layer signalling. Examples of common context are session identity, flow identity and allocated bandwidth for each flow in the session. The second type of context is called dynamic context. This context is defined for each flow and is updated frequently during a session. Examples of dynamic contexts are state information for IP header compression and packet schedulers. Further, dynamic context is related to events in the data path, such as the transmission or reception of a packet, and should therefore be processed in nodes along the data path, such as routers or middleboxes. On the other hand, common contexts are related to signalling events and should therefore be located in nodes that process session or IP layer signalling, such as a Midcom Agent.

Figure 2A:
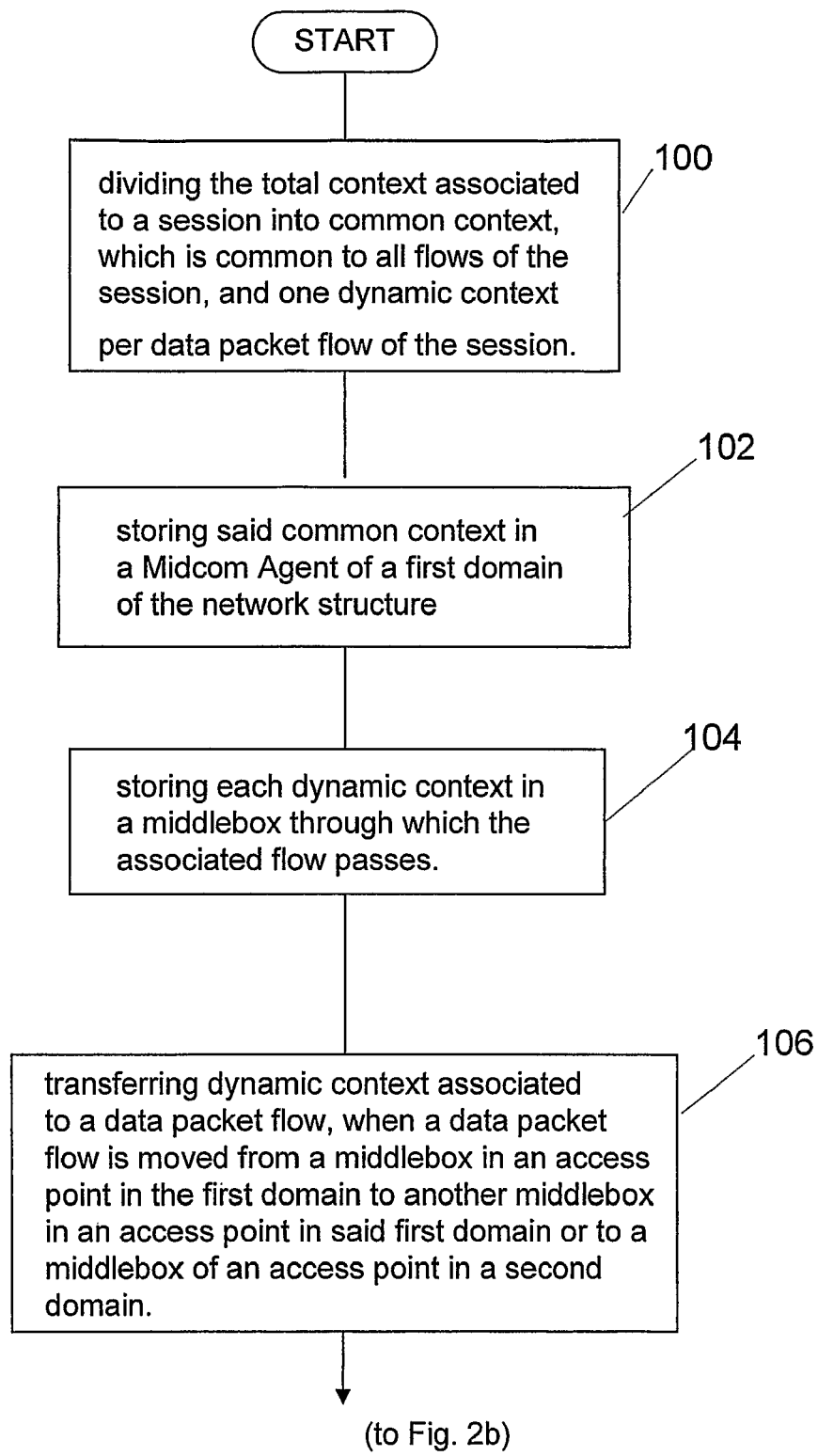
FIG. 2a is a flow chart showing a first part of the method according to an example embodiment. The flow chart continues in FIG. 2b.
Figure 2B:
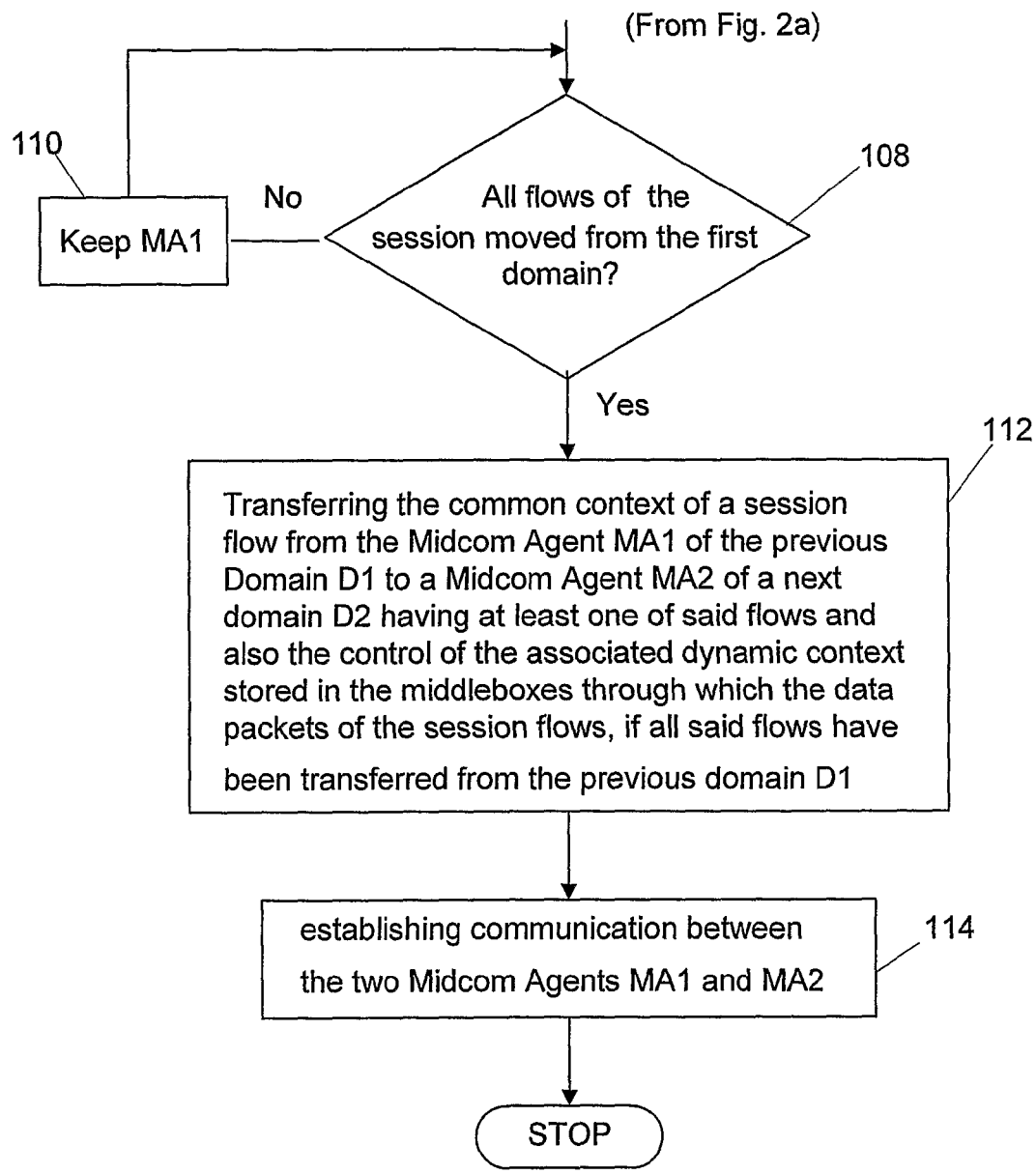

The requirements on the context transfer mechanism at hand-over are different for the two types of context, which will now be illustrated by means of FIG. 2, which is a flow chart of a preferred example embodiment. The first step, step 100, is performed when a session between user terminals is initiated and the data packet flows arrives to the access routers of the access points:

dividing the total context associated to a session into common context, which is common to all flows of the session, and one dynamic context per data packet flow of the session (step 100).

The Midcom Agent will execute steps 102 and 104:

storing said common context in a Midcom Agent of a first domain of the network structure(step 102);

storing each dynamic context in a middlebox through which the associated flow passes(step 104).

The common context is processed in a Midcom Agent MA1, called the first Midcom Agent, in a first domain D1 that is able to control several access routers (within its domain), and therefore the common context only has to be transferred when the session is handed over to a middlebox associated to an access router in a second domain D2 controlled by a different Midcom Agent MA2, the second Midcom Agent.

The dynamic context transfer is performed every time a flow is handed over between access routers, step 106:

transferring dynamic context associated to a data packet flow, when a data packet flow is moved from a middlebox in an access point in the first domain to another middlebox in an access point in said first domain or to a middlebox of an access point in a second domain.

When a dynamic context transfer is done to a middlebox MB of an access router that is controlled by another Midcom Agent MA there are two alternatives for the handling of the common context:

1. If there are flows belonging to the session in a first domain D1, even called the previous domain, the common context and the control of a session remain with the first Midcom Agent MA1, even called previous Midcom Agent MA1. The second Midcom Agent MA2, called the next Midcom Agent, will then be able to relay signalling messages between the first Midcom Agent MA1 and a middlebox in the second domain D2 associated to the next Midcom Agent MA2.

keeping in said Midcom Agent MA1 of the first domain D1 the common context of data packet flows of a session and the control of the dynamic context of each flow in middleboxes MB through which the data packets of the session flows as long as there is one flow belonging to said session in said first domain D1 (step 110).

2. If all flows belonging to the session are in the second domain D2, called the next domain, the common context is transferred to the next Midcom Agent MA2, which then assumes control of the session.

determining whether all flows belonging to the session are moved from the previous domain D1, or not (step 108);

Transferring the common context of a session flow from the Midcom Agent MA1 of the previous domain D1 to a Midcom Agent MA2 of a next domain D2 (having at least one of said flows) and also the control of the associated dynamic context stored in the middleboxes through which the data packets of the session flows, if all said flows have been transferred from the previous domain D1 (step 112).

In both cases 1 and 2, the previous Midcom Agent MA1 and the next Midcom Agent MA2 must establish communication with each other. This is handled by a middlebox (associated to the next Midcom Agent MA2 in the next domain D2), which knows the address of the next Midcom Agent MA2 via a standard domain internal agent discovery procedure. There are two alternatives in step 114 for establishing communication between the two Midcom Agents MA1 and MA2:

1. The middlebox (MB15 in FIG. 1) associated with an access router in the next domain D2 learns the previous Midcom Agent's (MA1) address via the dynamic context transfer, and sends it to the next Midcom Agent MA2, which then registers with the previous Midcom Agent MA1.

obtaining by means in the middleboxes in the previous domain D1 the address of the Midcom Agent MA1 in the first domain D1 from the dynamic context transfer between middleboxes in the previous domain D1 and next domain D2;

using by means of the Midcom Agent MA1 in the previous domain D1 said address for registering with and establishing communication with said Midcom Agent MA2 of said next domain D2.

2. The middlebox associated with an access router in the next domain D2 learns the previous Midcom Agent's (MA1) address via the dynamic context transfer, and sends a request to the previous Midcom Agent MA1 for registering with the next Midcom Agent MA2. The request includes the address of the next Midcom Agent MA2.

obtaining by means in the middleboxes in the next domain D2 the address of the Midcom Agent in the previous domain D1 from the dynamic context transfer between middleboxes in the previous domain D1 and next domain D2;

sending a request to the Midcom Agent MA1 of the previous domain D1, said request containing said address, for registering and establishing communication with the Midcom Agent MA2 of said second domain D2.

Alternatively, said addresses is possible to get by using a database storing the domain addresses of all the Midcom Agents in the network structure. Then the first method for establishing communication between the two Midcom Agents MA1 and MA2 will comprise following steps:

obtaining by means in the middleboxes in the previous domain D1 the domain address of the Midcom Agent MA1 of the previous domain D1 from a database storing the domain addresses of all the Midcom Agents in the network structure;

using said address for registering with and establishing communication with said Midcom Agent MA2 of said next domain D2.

The second method for establishing communication between the two Midcom Agents MA1 and MA2 will comprise following steps:

obtaining by means in the middleboxes in the next domain D2 the domain address of the Midcom Agent of the previous domain from a database storing the domain addresses of all the Midcom Agents in the network structure;

sending a request to the Midcom Agent MA1 of the previous domain D1, said request containing said address, for registering and establishing communication with the Midcom Agent of said second domain.

Alternatively, the first (previous) and second (next) Midcom Agent may have a Master-Slave relation. The first Midcom agent then instructs the second Midcom Agent to send signaling messages to the middleboxes in the domain of the second Midcom Agent.

The technology disclosed herein also relates to a Midcom Agent for handling context of data packet flows in a network system.

The method may be implemented by means of a computer program product comprising the software code means for performing the steps of the method. The computer program product is run on processing means, such as e.g. a server unit, a microprocessor, PC, data processing unit, CPU, etc., within a network, or in a separate processing means connected to a network. The computer program is loaded from a computer usable medium.

The present invention is not limited to the above-described preferred embodiments. Various alternatives, modifications and equivalents may be used. For example, the embodiments of the invention have been implemented by means of Internet Protocol technology (IP). However, the invention are also applicable with ATM (Asynchronous Transfer Mode) technology and MPLS (Multi Protocol Label Switching).

Therefore, the above embodiments should not be taken as limiting the scope of the invention, which is defined by the appending claims.

The invention claimed is:

1. A method for handling context of data packet flows, said flows being simultaneous and belonging to the same session, between terminals through a network structure comprising at least a network comprising a number of routers for routing data packet flows between the routers along data packet flow paths connecting said terminals, of which terminals at least one is mobile and may change access between different access points of said network structure, wherein an access point comprises an access router and a middlebox, which is controlled and supported by a Midcom Agent belonging to a domain of said network structure, the method comprising:

dividing a total context associated to a session into common context, which is common to all flows of the session, and one dynamic context per data packet flow of the session;
storing said common context in the Midcom Agent of a first domain of the network structure;
storing each dynamic context in the middlebox through which the associated flow passes;
transferring the dynamic context associated to the data packet flow when the data packet flow is moved from a middlebox in the first domain to another middlebox in an access point in said first domain or to a middlebox of an access point in a second domain;
determining whether all flows belonging to the session are moved from the first domain, or not;
transferring the common context of the session flow and the control of the associated dynamic context stored in the middleboxes through which the data packets of the session flows from the Midcom Agent of the first domain to the Midcom Agent of the second domain having at least one of said flows, if all said flows have been transferred from said first domain;
establishing communication between the Midcom Agent of the first domain and the Midcom Agent of the second domain.

2. The method according to claim 1, further comprising:
obtaining by means in the middleboxes the address of the Midcom Agent in the first domain from the dynamic context transfer between middleboxes in the first and second domain;
using said address for registering with and establishing communication with said Midcom Agent of said second domain.

3. The method according to claim 1, further comprising:
obtaining by means in the middlleboxes the address of the Midcom Agent in the first domain from the dynamic context transfer between middleboxes in the first and second domain;
sending by means in the Midcom Agent in the second domain a request to the Midcom Agent of the first domain, said request containing the address of the Midcom Agent of the second domain, for registering and establishing communication with the Midcom Agent of said second domain.

4. The method according to claim 1, further comprising:
obtaining by means in the middleboxes the domain address of the Midcom Agent of the first domain from a database storing the domain addresses of all the Midcom Agents in the network structure;
using said address for registering with and establishing communication with said Midcom Agent of said second domain.

5. The method according to claim 1, further comprising:
obtaining by means in the middleboxes the domain address of the Midcom Agent of the first domain from a database storing the domain addresses of all the Midcom Agents in the network structure;
sending a request to the Midcom Agent of the first domain, said request containing said address, for registering and establishing communication with the Midcom Agent of said second domain.

6. A network system for handling context of data packet flows, the network system comprising:
plural terminals;
a number of routers for routing data packet flows between the routers along data packet flow paths connecting said terminals;
wherein at least one of the terminals is mobile and may change access between different access points of said network structure;
an access point comprising an access router and a middlebox, which is controlled and supported by a Midcom Agent belonging to a domain of said network structure;
means for dividing a total context associated to a session into a common context, which is common to all flows of the session, and one dynamic context per data packet flow of the session;
means for storing said common context in the Midcom Agent of a first domain of the network structure;
means for storing each dynamic context in the middlebox through which the associated flow passes;
means for transferring dynamic context associated to the data packet flow, when the data packet flow is moved from a middlebox in the first domain to another middlebox in an access point in said first domain or to a middlebox of an access point in a second domain;
means for determining whether all flows belonging to the session are moved from the first domain, or not;
means for transferring the common context of a session flow and the control of the associated dynamic context stored in the middleboxes through which the data packets of the session flows from the Midcom Agent of the first domain to the Midcom Agent of the second domain having at least one of said flows, if all said flows have been transferred from said first domain;
means for establishing communication between the Midcom Agent of the first domain and the Midcom Agent of the second domain.

7. The network system according to claim 6, further comprising:
means in the middleboxes for obtaining the address of the Midcom Agent in the first domain from the dynamic context transfer between middleboxes in the first and second domain;
means for using said address for registering with and establishing communication with said Midcom Agent of said second domain.

8. The network system according to claim 6, further comprising:
means in the middleboxes for obtaining the address of the Midcom Agent in the first domain from the dynamic context transfer between middleboxes in the first and second domain;
means in the Midcom Agent in the second domain for sending a request to the Midcom Agent of the first domain, said request containing the address of the Midcom Agent of the second domain, and for registering and establishing communication with the Midcom Agent of said second domain.

9. The network system according to claim 6, further comprising:
means in the middleboxes for obtaining the domain address of the Midcom Agent of the first domain from a database storing the domain addresses of all the Midcom Agents in the network structure;
means for using said address for registering with and establishing communication with said Midcom Agent of said second domain.

10. The network system according to claim 6, further comprising:
means in the middleboxes for obtaining the domain address of the Midcom Agent of the first domain from a database storing the domain addresses of all the Midcom Agents in the network structure;

means for sending a request to the Midcom Agent of the first domain, said request containing said address, and for registering and establishing communication with the Midcom Agent of said second domain.

11. A Midcom Agent for handling context of data packet flows in a network system, wherein the Midcom Agent comprises:
  means for dividing a total context associated to a session into a common context, which is common to all flows of the session, and one dynamic context per data packet flow of the session;
  means for storing said common context in a Midcom Agent of a first domain of a network structure;
  means for storing each dynamic context in a middlebox through which the associated flow passes;
  means for controlling the transfer of dynamic context associated to a data packet flow, when the data packet flow is moved from a middlebox in the first domain to another middlebox in an access point in said first domain or to a middlebox of an access point in a second domain;
  means for determining whether all flows belonging to the session are moved from the first domain, or not;
  means for transferring the common context of the session flow and the control of the associated dynamic context stored in the middleboxes through which the data packets of the session flows from the Midcom, Agent of to first domain to the Midcom Agent of the second domain having at least one of said flows, if all said flows have been transferred from said first domain;
  means for establishing communication between the Midcom Agent of the first domain and the Midcom Agent of the second domain.

12. The Midcom Agent according to claim 11, further comprising:
  means in the middleboxes for obtaining the address of the Midcom Agent in the first domain from the dynamic context transfer between middleboxes in the first and second domain;
  means for using said address for registering with and establishing communication with said Midcom Agent of said second domain.

13. The Midcom Agent according to claim 11, further comprising:
  means in the middleboxes for obtaining the address of the Midcom Agent in the first domain from the dynamic context transfer between middleboxes in the first and second domain;
  means in the Midcom Agent in the second domain for sending a request to the Midcom Agent of the first domain, said request containing the address of the Midcom Agent of the second domain, and for registering and establishing communication with the Midcom Agent of said second domain.

14. The Midcom Agent according to claim 11, further comprising:
  means in the middleboxes for obtaining the domain address of the Midcom Agent of the first domain from a database storing the domain addresses of all the Midcom Agents in the network structure;
  means for using said address for registering with and establishing communication with said Midcom Agent of said second domain.

15. The Midcom Agent according to claim 11, further comprising:
  means in the middleboxes for obtaining the domain address of the Midcom Agent of the first domain from a database storing the domain addresses of all the Midcom Agents in the network structure;
  means for sending a request to the Midcom Agent of the first domain, said request containing said address, and for registering and establishing communication with the Midcom Agent of said second domain.

* * * * *

UNITED STATES PATENT AND TRADEMARK OFFICE
CERTIFICATE OF CORRECTION

PATENT NO. : 7,706,325 B2  Page 1 of 1
APPLICATION NO. : 10/584862
DATED : April 27, 2010
INVENTOR(S) : Fodor et al.

It is certified that error appears in the above-identified patent and that said Letters Patent is hereby corrected as shown below:

In Column 2, Line 55, delete "the," and insert -- the --, therefor.

In Column 5, Line 12, delete "td" before "technology".

In Column 11, Line 26, in Claim 11, delete "Midcom," and insert -- Midcom --, therefor.

In Column 11, Line 26, in Claim 11, delete "to" and insert -- the --, therefor.

Signed and Sealed this

Twenty-first Day of September, 2010

David J. Kappos
*Director of the United States Patent and Trademark Office*